3,788,834
METHOD OF BENEFICIATING ORES

Clarence L. Hildreth, Brookhaven, Miss., assignor to Ethyl Corporation, Richmond, Va.
No Drawing. Continuation-in-part of abandoned application Ser. No. 41,588, May 28, 1970. This application Feb. 26, 1973, Ser. No. 335,701
Int. Cl. C22b 1/08
U.S. Cl. 75—1                                    4 Claims

ABSTRACT OF THE DISCLOSURE

A method of beneficiating or upgrading alumina-silica or aluminum-silicate ores, especially natural clays containing substantial amounts of minerals such as kyanite, diaspore and the like and also containing contaminating amounts of iron and titanium, wherein the ore is heated to a relatively high temperature and treated with hexachlorobutadiene, hexachlorobenzene or mixtures largely comprising these compounds.

CROSS-REFERENCE TO RELATED APPLICATION

This application is a continuation-in-part of now abandoned U.S. application Ser. No. 41,588, filed on May 28, 1970.

BACKGROUND OF THE INVENTION

The present invention is in the broad field of metallurgy and in particular non-ferrous metallurgy. The invention especially relates to the beneficiation or chemical treatment of alumina-silica or aluminum-silicate ores and/or ores containing compounds of both aluminum and silicon for production of concentrates for electrothermal or carbothermic manufacture of aluminum-silicon alloys.

Natural aluminum-silicate ores, especially clays such as those largely comprising diaspore, kyanite, or the like contain large amounts of aluminum and silicon in oxidic form and also contain substantial quantities of contaminants such as iron and titanium, generally in oxidic form, although sometimes as sulfides or other entities. In the production of aluminum-silicon alloys from such ores, the iron and titanium metals produced by co-reduction with the aluminum and silicon are harmful impurities.

It has been found [N. I. Eremin, A. S. Bessonova, and V. G. Brin, Tr. Vses. Alyuminu-Magnievo Inst., 62 (1968)] that chlorination of kaolin and other types of alkali-free alumino-silicate raw materials is an effective method for production of concentrates for electrothermal manufacture of aluminum-silicon alloys. Heating of kaolin to 700–1300° C. followed by passage of chorine is recommended by Takamura Suzuki in Japanese Pat. No. 135(54), Feb. 11, 1954.

A method of removing iron by heating kaolins with carbonaceous materials in a current of chlorine was proposed by M. E. Nordberg in U.S. Pat. No. 2,141,444 issued Dec. 27, 1938. The possibility of volatilization of iron compounds from kaolins by means of chlorine was noted by T. Haase, Silikattechnik, 9 (1952), and by means of hydrogen chloride by V. I. Spitsyn, Chlorination of Oxides and Nitric Compounds (in Russian) (1931).

Kaolin minerals include kaolinite, dickite, nacrite, onauxite and halloysite-endellite. These minerals contain quantities of aluminum and silicon usually in the form of $Al_2O_3$ and $SiO_2$, respectively or as compounds thereof. Such compounds may be $(Al_2O_3)_x \cdot (SiO_2)_y \cdot zH_2O$, where $x$, $y$ and $z$ are normally small whole numbers such as 0, 1, 2, 3, etc. The alumina seldom exceeds 40% and generally ranges from about 32% to about 39% of the kaolin. Silica generally comprises about 40% to about 53%. Iron in the form of $Fe_2O_3$ and occasionally FeO comprises less than 2% of the kaolin and usually only about 0.3% to about 1.7%. Titanium content as $TiO_2$ ranges up to about 3% from a low of about 0.2%. Kaolin thus contains relatively small amounts of iron and titanium and even smaller amounts of alkali metals and chlorination has been reported to have achieved some reductions of these impurities in these relatively pure compounds. However, the process is not known to have been used commercially.

High-alumina minerals such as diaspore, and the like, although containing over 50% alumina, contain substantially larger amounts of iron and titanium, frequently about 8% and 6%, when calculated as $Fe_2O_3$ and $TiO_2$, respectively, or even higher amounts in some cases. In order for such a mineral or natural ore to be electrothermally or carbothermically reduced for effectively manufacturing aluminum-silicon alloys commercially suitable for separation of aluminum, the iron and titanium content is substantially decreased prior to reduction of the ore. Ideally, these undesirable elements should be decreased to less than 2% of the ore on the foregoing basis, and more desirably as low as 1%.

It is therefore a primary object of the present invention to provide a means for beneficiating or upgrading natural ores containing large amounts of alumina, smaller amounts of silica and substantial amounts of undesirable compounds of iron and titanium, usually in the form of oxides.

Another object of the present invention is to reduce the iron and titanium content of diaspore clay by treating such clay with a halogenated hydrocarbon which reacts with and removes most of the iron and titanium oxides while simultaneously producing some excess free carbon at temperatures of approximately 700° C. The free carbon thus produced can be used as reducing agent in the production of aluminum-silicon alloys from the treated clay.

A particular object of this invention is to provide a commercial use for the waste product obtained from the manufacture of halogenated hydrocarbons such as perchloroethylene and trichloroethylene.

Other objects and advantages of the present invention will become readily apparent from the hereinafter description of the invention.

SUMMARY OF THE INVENTION

It has been discovered that aluminosilicate ores or natural clays containing large quantities of alumina, and substantial quantities of both iron and titanium can be beneficiated and their iron and titanium contents substantially reduced by treating the ore or clay with hexachlorobutadiene and/or hexachlorobenzene at approximately 700° C. At higher temperatures, e.g. 900° C., the $Al_2O_3$ and $SiO_2$ in the ore are unduly attacked, and at lower temperautres, e.g. 500° C., there is insufficient reduction of the titanium impurities.

The halogenated hydrocarbon volatilizes at 700° C. and the vapor is quite stable at that temperature. However, the vapor reacts with the iron and titanium in the ore to pyrolyze and form the respective metal chlorides which are also volatile and driven out of the ore at the operating temperature.

The pyrolysis of the halogenated hydrocarbon yields carbon in an extremely fine form which is formed along with chlorine. Such freshly formed fine carbon with its high surface area is extremely active, and as a result the removal of iron and titanium takes place more rapidly than would occur if particulate carbon is added to the mineral and the mixture subjected to the return of separately provided chlorine, or would occur if the halogen was used alone without carbon.

Although the present invention is particularly directed to those natural clays containing substantial quantities of diaspore or kyanite minerals, other alumina-silica ores of high alumina content may be used. Some examples of other minerals are sillimanite, andalusite, mullite, nepheline, pyrophyllite, gibbsite, boehmite and cliachite or mixtures thereof. Diaspore clay comprises chiefly diaspore and boehmite, both having the chemical composition $Al_2O_3 \cdot H_2O$.

This invention is also applicable to other clays and ores including bauxitic clays and kaolin clays.

Although the clay may be heated prior to being contacted with the halogenated hydrocarbon, it is preferred that the heating and reducing treatment occur simultaneously.

In the preferred form of the invention, the ore is pre-crushed to the required mesh size. A mesh size of about —50 mesh (U.S. Sieve Series) or smaller is essential for effective titanium and iron removal. Smaller mesh sizes produce optimum results.

Hexachlorobutadiene and hexachlorobenzenes are particularly desirable chlorinating agents because they are normally quite stable and produced as a waste product in the manufacture of other halogenated hydrocarbons, e.g. perchloroethylene and trichloroethylene and are usable at little or no cost. The hydrocarbon waste stream from the manufacture of perchloroethylene and trichloroethylene typically contains by weight percent about 70–80% hexachlorobutadiene, 2–6% hexachlorobenzene, 2–11% other halo hydrocarbons and 7–12% unknown compounds. This waste product, similar waste products or other mixtures of hexachlorobutadiene and hexachlorobenzene may be used in this invention.

Examples of typical analyses of Heavy Ends Column Bottoms obtained from the manufacture of chlorinated hydrocarbons are as follows:

|  | Weight percent | |
|---|---|---|
|  | Sample 1 | Sample 2 |
| Hexachlorobutadiene | 77.421 | 74.007 |
| Trichlorobutadiene | 0.384 | 0.057 |
| Tetrachlorobutadiene | 1.449 | 1.878 |
| Hexachlorobenzene | 2.059 | 5.688 |
| Trichlorobenzene | 0.210 | 0.022 |
| Tetrachlorobenzene | 0.943 | 0.532 |
| Pentachlorobenzene | 3.316 | 0.491 |
| Hexachloroethane | 2.446 | 2.514 |
| Perchloroethylene | 0.653 | 3.130 |

While the composition of the column bottoms is variable, the concentration of hexachlorobutadiene (HCBD) generally runs at 70–80%. If the hot column bottoms is drawn off and allowed to cool and settle out suspended solids, the HCBD content of the clear liquid which remains approaches 90%. This clear liquid makes a better halogenating agent. The various chlorine-containing compounds such as hexachloroethane and perchloroethane are less stable than hexachlorobutadiene or hexachlorobenzene and accordingly pyrolyze even before the vapors contact the ore, so that they behave more like chlorine behaves in their reaction on the ore.

DESCRIPTION OF THE PREFERRED EMBODIMENT

In the preferred form of the invention, diaspore clay or kyanite of relatively fine mesh (about —400 mesh to about —50 mesh, U.S. Sieve Series) is placed in a suitable reactor in a furnace and heated to a temperature of about 700° C. While heating, a stream of hexachlorobutadiene vapor is introduced into the reactor as a gas through a suitable opening therein, in such fashion as to provide intimate contact with the previously charged hot finely divided clay and/or mineral, and the volatile products of reaction plus any excess vapor passed therethrough and passed out a second opening in the reactor. An inert gas, e.g. nitrogen, may be used to transport the halohydrocarbon vapors. The clay is treated (halogenated) for a period of time which will vary depending upon temperature, particle size of the clay, amount of iron and titanium present in the clay, degree of reduction in iron and titanium content desired and rate of vapor flow, but is conveniently and frequently about one-half to four hours. Certain ores may require longer reaction periods. The residual ore is then ready for the next processing step.

The reaction of hexachlorobutadiene or hexachlorobenzene with iron or titanium oxides in the ore produces the chlorides of the metals plus free carbon. Thus, feed is generated for the carboethermic reduction of the ore to produce aluminum-silicon alloy and the harmful iron and titanium contaminants are removed. The overall reactions are illustrated chemically using titanium as an example as follows:

$$3TiO_2 + 2C_4Cl_6 \rightarrow 3TiCl_4 + 6CO + 2C$$

or $$3TiO_2 + 2C_4Cl_6 \rightarrow 3TiCl_4 + 3CO_2 + 5C$$

$$3TiO_2 + 2C_6Cl_6 \rightarrow 3TiCl_4 + 6CO + 6C$$

or $$3TiO_2 + 2C_6Cl_6 \rightarrow 3TiCl_4 + 3CO_2 + 9C$$

Similar reactions occur with iron oxide.

A number of laboratory tests have been made wherein various sizes and types of clay minerals were treated with hexachlorobutadiene or other suitable halogenated hydrocarbons. The results of these tests are set forth hereinafter.

GENERAL PROCEDURE (1) The mineral was placed in a ceramic boat and the boat was placed in a high temperature glass or ceramic tube. The tube was inserted in a tube furnace and heated to the desired temperature. The temperature was measured using a chromel-alumel thermocouple inside a Vycor protection tube with the end of the protection tube located over the boat. A stream of halogenated hydrocarbon was passed through the tube, over the boat and out the other end of the tube. After the test the residual ore was cooled and weighed. Extractions were calculated by determining the weight of each material in the feed and in the product.

(2) The mineral was placed in a vertical Vycor tube with several ceramic Berl saddles at the bottom for uniformly distributing gas flow. The tube was inserted in a vertical furnace. A stream of inert gas, usually argon, was passed through the mineral bed to fluidize it. Temperature was measured with a chromel-alumel thermocouple encased in a Vycor protection tube inserted down the reaction tube with the end of the protection tube below the top of the bed of mineral. After the desired temperature was attained, the inert gas was shut off and halogenated hydrocarbon or a mixture of halogenated hydrocarbon and inert gas was turned on. At the end of the test, the reactor was cooled and the results calculated as in the foregoing paragraph (1).

The temperature may be measured by any convenient method. The tube may be of high temperature glass, ceramic or other material. In lieu of the Berl saddles, any other suitable means for producing increased uniformity of gas flow in the horizontal periphery may be used. In addition to argon, nitrogen, helium or other similar inert gases may be employed.

The halogenated hydrocarbon and/or the mixture of halogenated hydrocarbon and inert gas is passed through the ore at a sufficient rate to form a fluidized bed.

Example I

Following General Procedure (1), small amounts of diaspore clay of 230/325 mesh were placed in a boat and treated with hexachlorobutadiene at elevated temperatures. Tests were run at 500° C., 715° C. and 930° C. for three hours. About ten times as much hexachlorobutadiene was used in the 930° C. run as in the two runs at lower temperatures. All calculations on extraction are based on weight of feed × fraction of component in feed and weight of product × fraction of component in product. The results are set forth in Table I hereinafter.

TABLE I.—BENEFICIATION WITH HEXACHLOROBUTADIENE

| | | Product treated with hexachlorobutadiene at— | | | | | |
|---|---|---|---|---|---|---|---|
| | | 930° C. | | 715° C. | | 500° C. | |
| Constituent | Starting ore, percent | Analysis, percent | Extraction, percent | Analysis, percent | Extraction, percent | Analysis, percent | Extraction, percent |
| $Al_2O_3$ | 63.2 | 24.4 | 93.69 | 59.1 | 41.31 | 64.3 | 1.16 |
| $SiO_2$ | 18.2 | 36.9 | 66.95 | 25.2 | 13.27 | 17.6 | 6.24 |
| $Fe_2O_3$ | 8.7 | 1.2 | 94.50 | 2.7 | 80.54 | 5.7 | 36.45 |
| $TiO_2$ | 4.6 | 0.4 | 99.87 | 2.1 | 71.19 | 4.5 | 4.42 |

Doubling the reaction time at approximately 700° C. brings the Fe and Ti content down below 2% each and tripling that time brings these down to less than 1% each.

Example II

Using General Procedure (1), small amounts of diaspore clay of 230/325 mesh were placed in separate boats and treated with chlorine alone, chlorine with carbon (85% excess on basis of $Fe_2O_3$ and $TiO_2$) and with hexachlorobutadiene. Treatments were carried out at 900° C., with each run being made under identical procedures. The starting composition of the clay samples was 63.2% $Al_2O_3$, 18.2% $SiO_2$, 8.7% $Fe_2O_3$ and 4.6% $TiO_2$. The results of these comparative tests are set forth in Table II hereinafter.

TABLE II.—BENEFICIATION AT 930° C.

| | Chlorine | | Chlorine with carbon | | Hexachlorobutadiene | |
|---|---|---|---|---|---|---|
| Constituent | Analysis, percent | Extraction, percent | Analysis, percent | Extraction, percent | Analysis, percent | Extraction, percent |
| $Fe_2O_3$ | 1.6 | 83.4 | 1.2 | 89.6 | 1.2 | 94.5 |
| $TiO_2$ | 3.7 | 27.1 | 1.0 | 83.6 | 0.4 | 99.9 |

From the foregoing data it can readily be seen that the treatment of natural ores such as kyanite and diaspore with hexachlorobutadiene substantially reduces the iron and titanium impurities in such ores and makes them suitable for further processing, especially the manufacture of aluminum-silicon alloys via carbothermic reduction.

Hexachlorobenzene may be used in lieu of hexachlorobutadiene either in whole or in part with similar results.

Other impurities occurring in natural ores, such as vanadium, chromium, nickel and manganese, although generally occurring in considerably less amounts than iron and titanium, may also be decreased by the method of the present invention.

The present invention provides a relatively simple method for effectively simultaneously lowering the iron and titanium content of alumina-silica ores to be subsequently carbothermically reduced or otherwise reduced for making aluminum-silicon alloys. If such ores did not contain titanium, they could be treated by physical beneficiation means which would usually be sufficient for iron reduction.

Although lower temperatures can be employed in reducing the iron content of the natural ore or clay, a temperature of at least 700° C. is required for effective titanium reduction.

The chlorides driven off from the treated ore can be condensed and titanium chloride as well as any aluminum chloride separated out as useful byproducts. The treated ore can then be reduced to aluminum-silicon metal by a carbothermic or electro-thermal reduction process.

The foregoing disclosure and description of the invention is illustrative and explanatory thereof and various changes in the treating procedure may be made within the scope of the appended claims without departing from the spirit of the invention.

What is claimed is:

1. A method of reducing the titanium and iron content of an aluminum ore containing substantial amounts of these contaminants, which method comprises providing the ore in particulate form and contacting it at a temperature of about 700° C. with the vapor of essentially hexachlorobutadiene or hexachlorobenzene so that the vapor pyrolyzes at the contacting temperature to cause the titanium and iron in the ore to preferentially react with the pyrolyzed material and be driven out of the ore.

2. The method of claim 1, wherein the ore is largely diaspore clay.

3. The method of claim 1, wherein the particle size of the ore ranges from about —400 mesh to about —50 mesh, U.S. Sieve Series.

4. The method of claim 1, in which the vapor is that of the heavy end waste from the manufacture of chlorinated ethylenes and contain at least about 70% hexachlorobutadiene by weight.

References Cited

UNITED STATES PATENTS

| 2,755,178 | 7/1956 | Rasmussen | 75—148 X |
| 2,905,545 | 9/1959 | Cookston | 75—1 |
| 2,946,668 | 7/1960 | Richelson | 23—87 X |
| 3,240,557 | 3/1966 | Lerner | 75—112 X |
| 3,305,300 | 2/1967 | McBrayer | 75—111 X |
| 3,548,016 | 12/1970 | Sze | 23—219 X |

FOREIGN PATENTS

| 634,006 | 1/1962 | Canada | 75—111 |
| 744,415 | 2/1956 | Great Britain | 75—1 |
| 182,707 | 1/1955 | Austria. | |

OTHER REFERENCES

"Russian Chemical Reviews," vol. 33, No. 4, April 1964, p. 185.

ALLEN B. CURTIS, Primary Examiner

T. A. WALTZ, Assistant Examiner

U.S. Cl. X.R.

75—111